United States Patent [19]

Barnard

[11] Patent Number: 5,152,597
[45] Date of Patent: Oct. 6, 1992

[54] MAGNETO-OPTIC READOUT USING A POLARIZATION-PRESERVING OPTICAL FIBER

[75] Inventor: James A. Barnard, Conesus, N.Y.

[73] Assignee: Eastman Kodak Company, Rochester, N.Y.

[21] Appl. No.: 620,803

[22] Filed: Dec. 3, 1990

[51] Int. Cl.$^5$ .............................................. G02F 1/09
[52] U.S. Cl. .................................. 359/130; 369/110; 359/281; 359/283
[58] Field of Search ..................... 350/96.12, 375, 401, 350/376, 378; 369/110

[56] References Cited

U.S. PATENT DOCUMENTS

| | | | |
|---|---|---|---|
| 3,969,573 | 7/1976 | Bouwhuis et al. | 350/401 |
| 4,626,679 | 12/1986 | Huwayama et al. | 250/227 |
| 4,671,621 | 6/1987 | Dillon, Jr. et al. | 350/96.12 |
| 4,762,384 | 8/1988 | Hegarty et al. | 350/96.12 |
| 5,004,326 | 4/1991 | Sasaki | 350/375 |

FOREIGN PATENT DOCUMENTS

| | | | |
|---|---|---|---|
| 55-113019 | 9/1980 | Japan | 350/375 |
| 62-148918 | 7/1987 | Japan | 350/375 |
| 1167721 | 7/1989 | Japan | 350/375 |

OTHER PUBLICATIONS

Matsumoto, "Polarization-Independent Isolators for Fiber Optics," *Electronics and Communications in Japan*, vol. 62-C, No. 7, 1979, pp. 113-118.

*Primary Examiner*—Bruce Y. Arnold
*Assistant Examiner*—Martin Lerner
*Attorney, Agent, or Firm*—William W. Holloway

[57] ABSTRACT

Apparatus for reading out information magneto-optically recorded in a magnetic layer comprises a single, polarization-preserving optical fiber for transmitting plane-polarized readout radiation from a source to the recording layer, as well as for transmitting such radiation, upon being reflected by the recording layer, toward a pair of photodetectors for the differential detection of the Kerr rotation angles ($\pm\Theta_k$) produced by the up/down orientation of the vertically oriented magnetic domain in the recording layer. Optical feedback of the reflected readout radiation to the readout source is minimized by the provision of a pair of polarization beam-splitters having a 45 degree magneto-optic polarization-rotator (e.g. a Faraday rotator) positioned therebetween. The polarization beam-splitters and retardation plate are positioned in the optical path between the readout source and the optical fiber.

4 Claims, 2 Drawing Sheets

MAGNETO-OPTIC READOUT USING A POLARIZATION-PRESERVING OPTICAL FIBER

CROSS-REFERENCE TO RELATED APPLICATIONS

Reference is made to the commonly-assigned U.S. application Ser. No. 07/620,802 filed concurrently herewith in the name of Alan B. Marchant and entitled "MAGNETO-OPTIC READOUT USING A PO-LARIZATION PRESERVING OPTICAL GUIDE".

BACKGROUND OF THE INVENTION

The present invention relates to the field of magneto-optic recording and playback. More particularly, it relates to improvements in magneto-optic playback apparatus of the type which employs a polarization-preserving optical fiber for optically coupling a readout source and a movably-mounted objective lens for focusing readout radiation onto the data tracks of a magneto-optic recording element.

The method of optically reading magnetically recorded digital information by the use of the magneto-optic Kerr effect is well-known. Such method basically involves the steps of scan-irradiating the recording element with a continuous-wave beam of plane-polarized radiation (e.g. emanating from a c-w laser), and detecting small clockwise or counterclockwise rotations, typically on the order of 2 degrees or less, in the plane of polarization of the reflected beam. The direction of such rotation is determined by the orientation (either up or down) of the irradiated, vertically-oriented magnetic domains representing the recorded information.

In conventional magneto-optic recording systems, the recording element takes the form of a relatively thick (e.g. 1 or 2 millimeters) transparent disk which supports a relatively thin (e.g. 100 nanometers) layer of magneto-optic recording material. The magneto-optic layer may comprise any one of a variety of compounds which exhibits a relatively strong Kerr effect, and presently preferred materials include thin films of a transition metal/rare-earth alloy. During readout, the disk is rotated about its central axis while the magneto-optic layer is irradiated through the transparent support with a focused beam of plane-polarized radiation provided by a movably mounted optical head or pick-up. The source of such radiation is usually a laser diode which is mounted within the head structure and moves therewith.

In U.S. Pat. No. 4,626,679 issued on Dec. 2, 1986 in the name of Kuwayama et al. there is disclosed a variety of optical head configurations in which a laser source and a photodetector package are optically coupled to a movably mounted objective lens by one or more flexible optical fibers. This "split-head" arrangement allows the more bulky and heavier head components to remain stationary relative to the disk while only the objective lens used to focus the readout beam on the disk is moved radially relative to the disk surface. To readout the information on a magneto-optic recording element, this patent discloses an optical head comprising two fibers, one for transmitting readout radiation from the stationary source to the movably-mounted objective lens, and the other for transmitting readout radiation reflected from the recording element to a stationary photodetector package which, by means of a differential detection scheme, operates to produce a signal representing the digital information recorded.

In the commonly-assigned U.S. application Ser. No. 07/620,802, filed concurrently herewith in the names of Alan B. Marchant and entitled "MAGNETO-OPTIC READOUT USING A POLARIZATION-PRESERVING OPTICAL GUIDE", there is disclosed an improved version of the readout apparatus disclosed in the above-mentioned U.S. Pat. No. 4,626,679. Such apparatus comprises a single optical fiber for transmitting and receiving readout radiation, a 22.5 degrees phase-retardation plate positioned between the output end of the fiber and the recording element and a pair of beam-splitters positioned between the laser source and the input end of the optical fiber. The beam-splitter closer to the fiber's input end is a polarizing beam-splitter (PBS), whereas the other is not. The phase-retardation plate operates to rotate the plane of polarization of the reflected radiation by a total of 45 degrees relative to its original plane, and the optical fiber serves to convert the reflected, polarization-rotated readout radiation into its two orthogonal polarization components. One component of this reflected radiation is reflected by the polarizing beam-splitter toward a photodiode, while the other component continues toward the laser source without any substantial attenuation. The non-polarizing beam-splitter reflects a portion, e.g. 50%, of such other component to a second photodiode, and the remainder is transmitted back to the laser source. Here again, the magneto-optic readout signal is derived by a differential detection technique in which the difference in the photocurrent between the two photodiodes is measured.

While the above-described apparatus affords certain real advantages over the apparatus disclosed in U.S. Pat. No. 4,626,679, the use of a partial (i.e. non-polarizing) beam-splitter in such apparatus presents at least three disadvantages. First, the reflected radiation incident on the second photodiode (i.e. the photodiode to which the partial beam-splitter reflects radiation) is substantially lower (by about 50%) than the reflected radiation incident upon the first photodiode; therefore, the electrical gain must be higher for the second photodiode than for the first. Secondly, a substantial portion of the readout radiation is lost from the laser as it passes through the partial beam-splitter on its way to the recording element; therefore, when the same optical head is used for recording, as well as playback, less power is available for recording. Thirdly, and perhaps more importantly, a relatively large amount of readout radiation is allowed to reflect back to the laser source; this has the effect of considerably increasing the laser mode noise.

SUMMARY OF THE INVENTION

In view of the foregoing discussion, an object of this invention is to provide a magneto-optic playback apparatus of the last-mentioned type in which the above-mentioned disadvantages are overcome.

According to the invention, the above-mentioned partial beam-splitter (which is the source of the above-noted disadvantages) is eliminated and replaced by (a) a second polarizing beam-splitter, having its orthogonal transmission/reflectance planes rotated at a 45 degree angle relative to the same planes of the first beam-splitter, and (b) a 45 degree magneto-optic polarization rotator (e.g. a 45 degree Faraday rotator) located between the two polarizing beam-splitters. Preferably, the plane of polarization of the laser source is aligned with the transmission plane of the newly added polarization beam-splitter.

As a result of the above substitution of components, a preferred form of the magneto-optic readout apparatus of the invention comprises: (a) a source of plane-polarized radiation; (b) a flexible polarization-preserving optical fiber having an input end and an output end, such optical fiber being adapted to transmit plane polarized radiation between its two ends in either or both of two transmission modes defined by first and second transverse axes separated by 90 degrees; (c) a first lens positioned between the radiation source and the fiber's input end for focusing radiation emanating from the source onto the fiber's input end, the optical fiber being oriented so that either one of its transverse axes is aligned with the plane of polarization of the source radiation focused on the fiber's input end by the first lens; (d) a second lens positioned between the fiber's output end and the recording element for focusing radiation emanating from the fiber's output end onto the recording element and for focusing radiation reflected by the recording element onto the fiber's output end; (e) a 22.5 degree Faraday rotator positioned between the fiber's output end and the recording element for rotating the plane of polarization of radiation emanating from and reflected back to such output end by a total of 45 degrees, such optical fiber being oriented with respect to the reflected and polarization-rotated radiation so that the transverse axes thereof are arranged at about 45 degrees with respect to the plane of polarization of the reflected polarization-rotated radiation, whereby the reflected and polarization-rotated radiation is converted by the fiber to plane-polarized radiation having two orthogonal components of approximately equal intensity; (f) beam-splitting means positioned between the fiber's input end and the radiation source for spatially separating the two orthogonal polarization components to produce two discrete plane-polarized beams having planes of polarization separated by 90 degrees, such beam-splitting means comprising a pair of polarization-type beam splitters having a 45 degree Faraday rotator positioned therebetween, the transmission/reflection plane of one beam-splitter being oriented at a 45 degree angle with respect to the transmission/reflection planes of the other; (g) photodetector means positioned in each of the spatially separated, plane-polarized beams for detecting the respective intensity of said beams; and (h) circuit means, operatively connected to said photodetector means, for producing a signal proportional to the difference in intensities of the spatially separated, plane-polarized beams.

By virtue of the beam-splitting means noted above, at least four important advantages arise, viz., (1) substantially 100% of the readout radiation is directed toward the recording element, (2) substantially all of the radiation reflected from the recording element is directed toward one or the other of the two photodetectors, (3) substantially none of the reflected radiation returns to the laser source; and (4) both photodetectors receive approximately equal amounts of reflected readout radiation. Therefore, the efficiency of the readout apparatus is improved, the output signal level is increased, the laser noise level is minimized, and the electronics complexity is reduced.

The invention and its various advantages will become more apparent to those skilled in the art from the ensuing detailed description of a preferred embodiment, reference being made to the accompanying drawings.

DETAILED DESCRIPTION OF PREFERRED EMBODIMENTS

Figure 1:
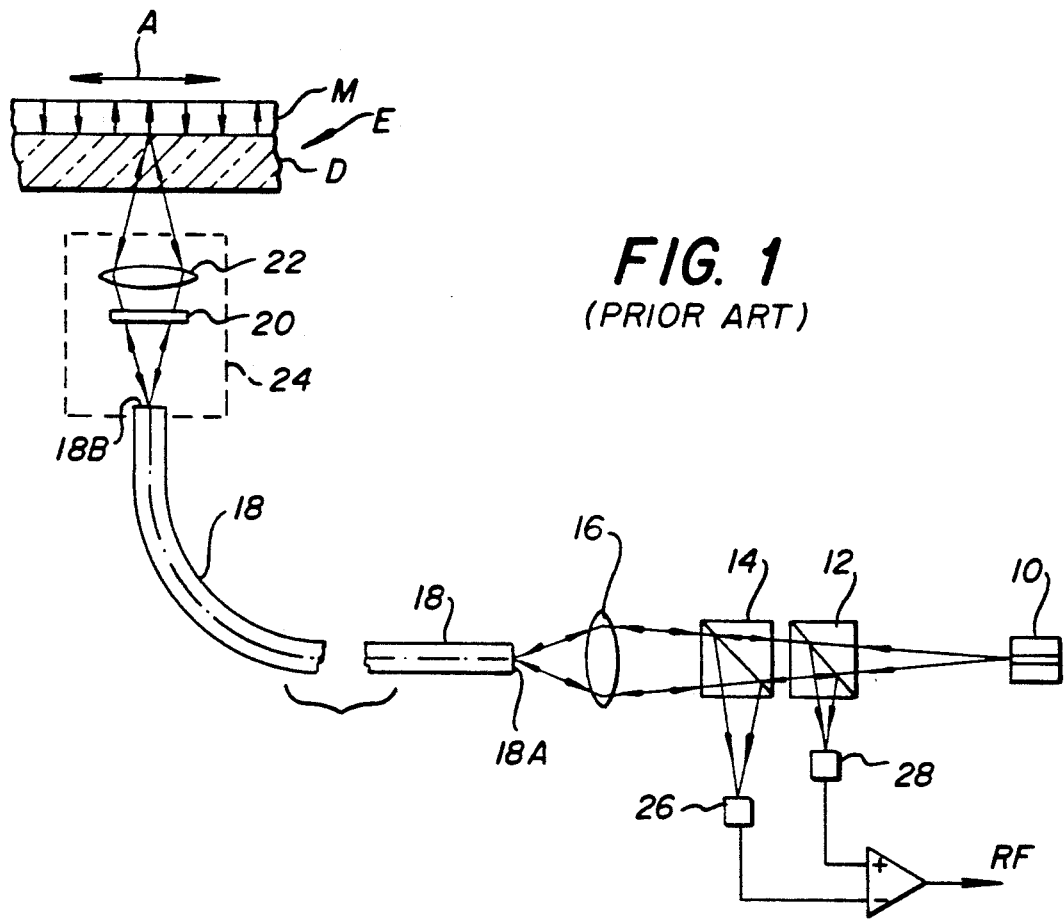
FIG. 1 is a schematic illustration of a magneto-optic playback apparatus over which the apparatus of the invention represents an improvement.

Referring now to the drawings, FIG. 1 schematically illustrates a magneto-optic playback apparatus of the type disclosed in the aforementioned U.S. application Ser. No. 07/620,802, filed in the name of Alan B. Marchant. Such apparatus is designed to be utilized with a prerecorded magneto-optic recording element E which typically comprises a transparent disk D which supports having a magnetic recording layer M composed of vertically oriented magnetic domains (indicated by the small vertically oriented arrows). The up/down orientation of these domains is representative of the recorded digital data. Owing to the well-known Kerr effect, the recorded data can be readout by scanning the recording element with a beam of plane-polarized radiation and monitoring the reflected beam for small angular changes (e.g. ±1 or 2 degrees) in the plane of polarization. Scan-irradiation of the disk with readout radiation is commonly effected by rotating the disk about its central axis while irradiating the disk at a stationary point. The radial position of such point can, of course, be varied so as to readout data from any of a plurality of concentric data tracks on a disk. The scanning motion produced by the disk rotation is indicated schematically by the arrow A.

The optical head illustrated in FIG. 1 is of the so-called "split-head" design in that most of the components, including the source of readout radiation, the beam-splitters, and the photodetectors and their associated electronics are mounted in a housing (not shown) which remains stationary while only the objective lens used to focus the readout radiation on the disk, Faraday rotator (discussed below) and a single optical fiber used to optically couple the stationary components of the readout apparatus with the objective lens are mounted for radial movement relative to the disk.

Referring to FIG. 1, plane-polarized radiation emitted by a laser diode 10 passes through beam-splitters 12 and 14 and is brought to focus by a lens 16 onto the input end 18A of an optical fiber 18. Beam-splitter 12 is designed to partially transmit and partially reflect incident radiation, regardless of its polarization state. On the other hand, beam-splitter 14 is of the polarization type, being adapted to transmit substantially 100% of radiation polarized in a given plane, and to reflect substantially 100% of radiation polarized in an orthogonal plane. The polarization beam-splitter is oriented to totally transmit the plane-polarized radiation emitted from the laser source 10.

Figure 2:
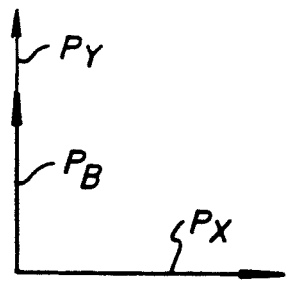
FIGS. 2 and 3 are polarization plots which facilitate an understanding of the invention.

The optical fiber 18 is of the type adapted to preserve the polarization of radiation transmitted thereby and has two orthogonal transmission axes $P_Y$ and $P_X$, shown in FIG. 2. To preserve the plane-polarization of radiation transmitted by the fiber, the optical fiber 18 must be oriented so that the plane of polarization of readout laser beam $B_p$ incident on the fiber end is aligned with either of its transmission axes. The plane-polarized radiation emergent from the fiber's output end 18B is passed through a magneto-optic polarization-rotator 20, such as a conventional Faraday rotator, and brought to focus on the magnetic recording layer M of the recording element E by a lens 22. The Faraday rotator 20 is designed to rotate the plane of polarization of radiation passing in either direction therethrough by 22.5 degrees. As indicated above, the Faraday rotator, lens 22 and fiber 18 are the major constituents of the movable portion 24 of the readout head.

Figure 3:
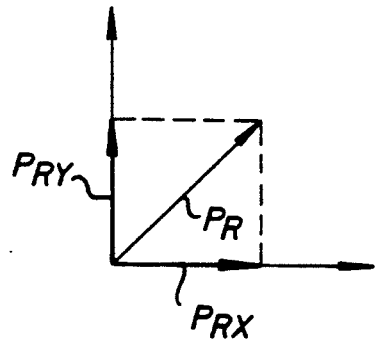

Upon reflecting from the recording element, the plane-polarized radiation, which is now rotated 22.5 $\pm\Theta_k$ degrees with respect to its original plane, ($\Theta_k$ being the Kerr rotation angle) passes back through the lens 22 and plate 20 and is brought to focus on fiber end 18B. Having passed through the Faraday rotator a second time, the plane of polarization of the reflected radiation is now inclined at a 45 degree angle with respect to its original plane; more importantly, however, the polarization plane of the reflected radiation is now inclined at a 45 degree angle with respect to both the $P_Y$ and $P_X$ axes of the optical fiber 18. As a result of this 45 degree orientation, X and Y components of, $P_{RX}$ and $P_{RY}$, the reflected plane-polarized radiation $P_R$ is transmitted equally along each of the transmission axes of the fiber. (See FIG. 3).

Upon exiting from the input end 18A of fiber 18, the reflected radiation again passes through lens 16 which now serves to bring the reflected radiation to focus on photodetectors 26 and 28 via beam-splitters 14 and 12. Upon striking the polarized beam-splitter 14, one polarization component is deflected to photodetector 26 while the orthogonal component is transmitted to beam-splitter 12. As indicated above, beam-splitter 12 is designed to partially reflect a portion of its incident radiation at a 90 degree angle, in this case, toward the photodetector 28, and to transmit the remaining portion in the direction of incidence, in this case, back to the laser cavity. Upon being appropriately preamplified to equalize the unequal attenuation effects provided by the two beam-splitters, the respective outputs of the photodetectors are subtracted by a differential amplifier 30 to provide a RF signal representing the recorded data. As noted above, the beam-splitting apparatus used to deflect portions of the reflected readout radiation toward the two photodetectors present certain disadvantages which the apparatus of the invention is designed to remedy.

Figure 4:
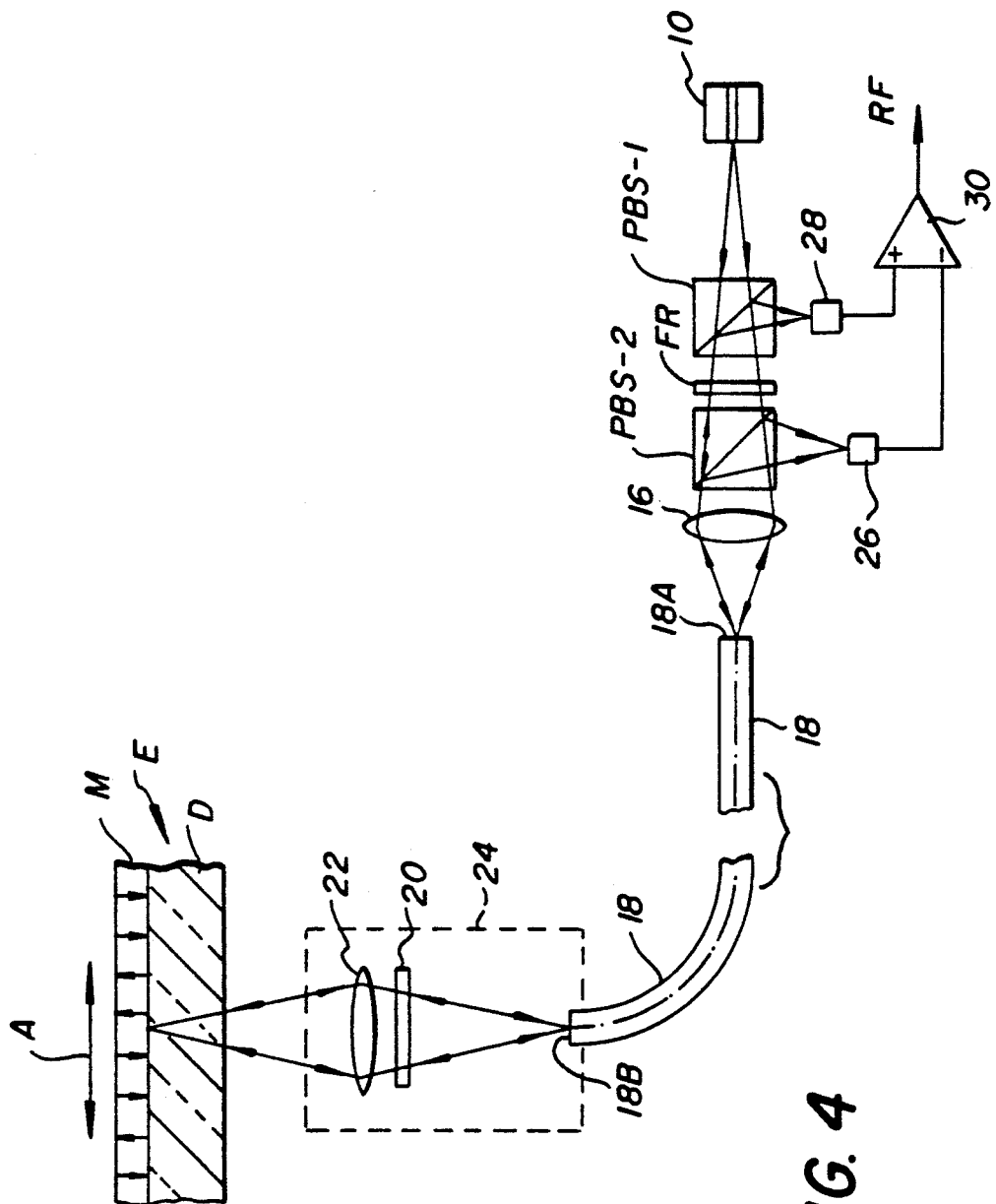
FIG. 4 schematically illustrates a preferred embodiment of the magneto-optic readout apparatus of the present invention.

Referring to FIG. 4, it will be seen that the beam-splitting apparatus of FIG. 1 has been modified to include a pair of conventional beam-splitting prisms PBS-1 and PBS-2 between which a conventional 45 degree magneto-optic polarization-rotator, preferably a Faraday rotator, is positioned. Each of these beam-splitters is designed to transmit 100% of plane-polarized radiation in a given plane and to reflect 100% of plane-polarized radiation in an orthogonal plane. The transmission/reflection planes of PBS-1 are oriented at a 45 degree angle with respect to the same planes of PBS-2. With these elements in the optical path of the readout radiation, the readout apparatus of the invention operates as follows: Laser 10 is oriented so that the plane-polarized radiation emitted thereby is aligned with (i.e. is parallel to) the polarization plane to which PBS-1 is 100% transmissive; thus, no radiant energy is lost in passing through PBS-1. The plane-polarized radiation transmitted by PBS-1 strikes Faraday rotator FR and the plane of polarization thereof is rotated 45 degrees, thereby being in alignment with the polarization plane at which PBS-2 is 100% transmissive. Again, there is no loss of radiant energy in passing through PBS-2.

Having passed through the two beam-splitters without experiencing any substantial optical losses, optical fiber 18 serves to optically couple the plane-polarized laser radiation with objective lens 22 in the manner described above with reference to the FIG. 1 apparatus. After passing through the 22.5 degree Faraday rotator twice and reflecting from the recording element once, fiber 18 separates the reflected radiation equally into its orthogonal X and Y components. Upon emerging from fiber end 18A, the reflected radiation passes through lens 16 and strikes PBS-2 which serves to reflect one polarization component to photodetector 26, and to transmit the orthogonal component to the Faraday rotator. The latter again serves to further rotate the plane of polarization of radiation passing therethrough by 45 degrees, thereby aligning the plane of polarization with that polarization plane to which PBS-2 is 100% reflective. Radiation striking PBS-2 is thus reflected to photodetector 28. The respective outputs of photodetectors 26 and 28 are subtracted to derive an RF signal representative of the Kerr rotation angle $\Theta_k$ and the recorded digital data.

From the foregoing, it will be appreciated that by virtue of the combination of the Faraday rotator and the two polarizing beam-splitters, virtually none of the radiation reflected from the disk returns to the laser cavity and, hence, the laser mode noise is virtually immune to optical feedback. Also, virtually all of the radiation emitted by the laser reaches the recording element and is useful for recording and/or playback. This has the effect of allowing the laser to be operated at a lower power level or, alternatively, of allowing the disk to be rotated at faster speeds. Finally, since there is no differential attenuation of one plane of polarization vis-a-vis the orthogonal plane, there is no need for a non-equal amplification of one photodetector output vis-a-vis the other; thus, the electronic complexity of the FIG. 1 system is reduced.

The invention has been described in detail with particular reference to certain preferred embodiments thereof, but it will be understood that variations and modifications can be effected within the spirit and scope of the invention.

What is claimed is:

1. Apparatus for reading out information recorded on a magneto-optic recording element, said apparatus comprising:
   (a) a source of plane-polarized radiation;
   (b) a flexible polarization-preserving optical fiber having an input end and an output end, said optical fiber being adapted to transmit plane polarized radiation between its two ends in either or both of two transmission modes defined by first and second transverse axes separated by 90 degrees;
   (c) a first lens positioned between the radiation source and the fiber's input end for focusing radiation emanating from said source onto the fiber's input end, said optical fiber being oriented so that either one of said transverse axes is aligned with the plane of polarization of radiation focused on the fiber's input end by said first lens;

(d) a second lens positioned between the fiber's output end and a magneto-optic recording element for focusing radiation emanating from the fiber's output end onto the recording element and for focusing radiation reflected by the recording element onto the fiber's output end;

(e) a 22.5 degree magneto-optic polarization-rotator positioned between the fiber's output end and the recording element for rotating the plane of polarization of radiation emanating from and reflected back to said output end by a total of 45 degrees, said optical fiber being oriented with respect to the reflected and polarization-rotated radiation so that the transverse axes thereof are arranged at about 45 degrees with respect to the plane of polarization of the reflected and polarization-rotated radiation, whereby the reflected and polarization-rotated radiation is converted to plane-polarized radiation having two orthogonal components of approximately equal intensity;

(f) beam-splitting means positioned between the fiber's input end and said radiation source for spatially separating said two orthogonal polarization components to produce two discrete plane-polarized beams having planes of polarization separated by 90 degrees, said beam-splitting means comprising a pair of polarization-type beam splitters having a 45 degree magneto-optic polarization-rotator positioned therebetween, each of said polarization type beam-splitters being adapted to transmit substantially 100% of incident plane-polarized radiation in a given plane and to reflect substantially 100% of incident radiation in an orthogonal plane, one of said beam-splitters being oriented with respect to the other so that the respective polarization planes to which it is 100% reflective and transmissive are oriented at 45 degrees with respect to the respective planes to which the other beam-splitter is 100% reflective and transmissive;

(g) photodetector means positioned in each of the spatially separated, plane-polarized beams for detecting the respective intensity of said beams; and (h) circuit means, operatively connected to said photodetector means, for producing a signal proportional to the difference in intensities of the spatially separated, plane-polarized beams.

2. The apparatus as defined by claim 1 wherein both said 22.5 and 45 degree magneto-optic polarization rotators comprise Faraday rotators.

3. Apparatus for reading out information recorded on a magneto-,optic recording element, said apparatus comprising:

(a) a continuous-wave laser for producing a beam of plane-polarized radiation;

(b) a flexible polarization-preserving optical guide having an input end and an output end, said optical guide being adapted to transmit plane polarized radiation between its two ends in either or both of two transmission modes defined by first and second transverse axes separated by 90 degrees;

(c) first focusing means for focusing said beam onto the guide's input end, said optical guide being oriented so that either one of its transverse axes is aligned with the plane of polarization of the beam focused on the guide's input end by said first focusing means;

(d) second focusing means for focusing radiation emanating from the guide's output end onto a magneto-optic recording element and for focusing radiation reflected by the recording element onto the guide's output end;

(e) polarization-rotating means for rotating the plane of polarization of radiation emanating from and reflected back to the guide's output end by a total of 45 degrees, said optical guide being oriented with respect to the reflected and polarization-rotated radiation so that the transverse axes thereof are arranged at about 45 degrees with respect to the plane of polarization of the reflected and polarization-rotated radiation, whereby the reflected and polarization-rotated radiation is converted to plane-polarized radiation having two orthogonal components of approximately equal intensity;

(f) beam-splitting means positioned between the fiber's input end and said laser for spatially separating said two orthogonal polarization components to produce two discrete plane-polarized beams having planes of polarization separated by 90 degrees, said beam-splitting means comprising a pair of polarization-type beam splitters having therebetween a device for rotating the plane of plane-polarized radiation incident thereon by 45 degrees, each of said polarization type beam-splitters being adapted to transmit substantially 100% of incident plane-polarized radiation in a given plane and to reflect substantially 100% of incident radiation in an orthogonal plane, one of said beam-splitters being oriented with respect to the other so that the respective polarization planes to which it is 100% reflective and transmissive are oriented at 45 degrees with respect to the respective planes at which the other beam-splitter is 100% reflective and transmissive; and (g) photoelectric means for detecting the difference in intensity between said spatially separated beams.

4. The apparatus as defined by claim 3 wherein said device comprises a Faraday rotator.

* * * * *